(12) United States Patent
Bookbinder et al.

(10) Patent No.: US 9,594,212 B2
(45) Date of Patent: Mar. 14, 2017

(54) MULTIMODE OPTICAL FIBERS

(71) Applicant: Corning Incorporated, Corning, NY (US)

(72) Inventors: Dana Craig Bookbinder, Corning, NY (US); Ming-Jun Li, Horseheads, NY (US); Gaozhu Peng, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/059,620

(22) Filed: Mar. 3, 2016

(65) Prior Publication Data
US 2016/0266308 A1     Sep. 15, 2016

Related U.S. Application Data

(60) Provisional application No. 62/131,883, filed on Mar. 12, 2015.

(51) Int. Cl.
*G02B 6/028* (2006.01)
*G02B 6/036* (2006.01)

(52) U.S. Cl.
CPC ......... *G02B 6/0288* (2013.01); *G02B 6/0365* (2013.01); *G02B 6/03694* (2013.01); *G02B 6/03627* (2013.01)

(58) Field of Classification Search
CPC   G02B 6/0288; G02B 6/0365; G02B 6/03694; G02B 6/03627
See application file for complete search history.

(56) References Cited

U.S. PATENT DOCUMENTS

| | | | |
|---|---|---|---|
| 4,009,014 A | 2/1977 | Black | |
| 4,111,525 A | 9/1978 | Kaminow | |
| 7,406,235 B2 | 7/2008 | Guan | |
| 7,421,174 B2 | 9/2008 | Fleming, Jr. | |
| 8,385,703 B2 * | 2/2013 | Bennett | G02B 6/0288 385/123 |
| 2005/0053351 A1 | 3/2005 | Guan et al. | |

(Continued)

OTHER PUBLICATIONS

International Search Report and Written Opinion PCT/US2016/021288 Dated Jul. 4, 2016.

*Primary Examiner* — Sung Pak
(74) *Attorney, Agent, or Firm* — Kevin L. Bray (57) ABSTRACT

A multimode optical fiber may include a core portion formed from $SiO_2$ intentionally doped with a single dopant, wherein the single dopant is phosphorous or a compound of phosphorous. A glass cladding portion may surround and be in direct contact with the core portion. The glass cladding portion may comprise an outer cladding portion and a low-index moat disposed between the core portion and the outer cladding portion. The optical fiber may also have a bandwidth greater than or equal to 2000 MHz-km for each wavelength within a wavelength operating window centered on a wavelength within an operating wavelength range from about 850 nm to about 1310 nm, the wavelength operating window having a width greater than 100 nm. The optical fiber may also have a restricted launch bend loss less than or equal to 0.5 dB/(2 turns around a 15 mm diameter mandrel) at 850 nm.

19 Claims, 7 Drawing Sheets

(56) References Cited

U.S. PATENT DOCUMENTS

| | | | |
|---|---|---|---|
| 2009/0169163 A1* | 7/2009 | Abbott, III | G02B 6/0365 |
| | | | 385/127 |
| 2012/0230638 A1* | 9/2012 | Bickham | G02B 6/0288 |
| | | | 385/124 |
| 2013/0114934 A1 | 5/2013 | Bookbinder | |
| 2013/0114935 A1 | 5/2013 | Bookbinder | |
| 2014/0119701 A1 | 5/2014 | Chen et al. | |

* cited by examiner

MULTIMODE OPTICAL FIBERS

This application claims the benefit of priority under 35 U.S.C. §119 of U.S. Provisional Application Ser. No. 62/131,883 filed on Mar. 12, 2015 the content of which is relied upon and incorporated herein by reference in its entirety.

BACKGROUND

Field

The present specification generally relates to optical fibers and, more specifically, to high bandwidth multimode optical fibers with core portions doped with phosphorous or a compound of phosphorous.

Technical Background

In recent years optical fiber has become accepted as a viable alternative to traditional materials used for data signal communication. Optical fiber is now widely utilized in a variety of electronic systems to facilitate high-speed communication of data signals between various components. As the speed and bandwidth of digital electronic components continues to increase, so to does the need for optical fibers capable of communicatively coupling these electronic components while maintaining both the speed and bandwidth of the electronic components.

In addition, bending losses associated with optical fibers may also limit the utility of optical fibers in certain applications, such as fiber to the home applications (i.e., fiber home networks). For example, in certain applications, the ability to form a tight bending diameter of 20 mm or less in an optical fiber with negligible bending losses may be desirable.

Accordingly, a need exists for alternative optical fiber designs which allow for high bandwidths and which have low bend losses.

SUMMARY

According to one embodiment, an optical fiber may include a core portion having an alpha profile and formed from $SiO_2$ intentionally doped with a single dopant, wherein the single dopant is phosphorous or a compound of phosphorous. A glass cladding portion may surround and be in direct contact with the core portion. The glass cladding portion may be formed from $SiO_2$ and comprise an outer cladding portion and a low-index moat disposed between the core portion and the outer cladding portion. The core portion may have a maximum relative refractive index $\Delta_{1max}\%$ relative to the outer cladding portion. The low-index moat may have a minimum relative refractive index $\Delta_{3min}\%$ relative to the outer cladding portion. $\Delta_{1max}\%$ may be greater than $\Delta_{3min}\%$. The optical fiber may also be multimoded with a bandwidth greater than or equal to 2000 MHz-km for each wavelength within a wavelength operating window centered on a wavelength within an operating wavelength range from about 850 nm to about 1310 nm, the wavelength operating window having a width greater than 100 nm. The optical fiber may also have a restricted launch bend loss less than or equal to 0.5 dB/(2 turns around a 15 mm diameter mandrel) at 850 nm.

In another embodiment, an optical fiber may include a core portion formed from $SiO_2$ intentionally doped with a single dopant such that the core portion has an α-profile with an α value greater than or equal to 1.95 and less than or equal to 2.15, wherein the single dopant is $P_2O_5$ in a concentration from about 19 wt. % to about 33 wt. %. A glass cladding portion may surround and directly contact the core portion. The glass cladding portion may be formed from $SiO_2$ and comprise an outer cladding portion, a low-index moat disposed between the core portion and the outer cladding portion, and an inner cladding portion disposed between the low-index moat and the core portion. The core portion may have a maximum relative refractive index $\Delta_{1max}\%$ relative to the outer cladding portion. The inner cladding portion may have a relative refractive index $\Delta_2\%$ relative to the outer cladding portion. The low-index moat may have a minimum relative refractive index $\Delta_{3min}\%$ relative to the outer cladding portion. The outer cladding portion may have a relative refractive index $\Delta_4\%$. $\Delta_{1max}\% > \Delta_2\% > \Delta_{3min}\%$, and $\Delta_4\% \geq \Delta_2\%$. The optical fiber may be multimoded at wavelengths up to about 1310 nm. The optical fiber may have a bandwidth greater than or equal to 2000 MHz-km for each wavelength within a wavelength operating window centered on at least one wavelength within an operating wavelength range from about 850 nm to about 1310 nm, the wavelength operating window having a width greater than 100 nm. The optical fiber may have a restricted launch bend loss less than or equal to 0.5 dB/(2 turns around a 15 mm diameter mandrel) at 850 nm.

Additional features and advantages of the multimode optical fibers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
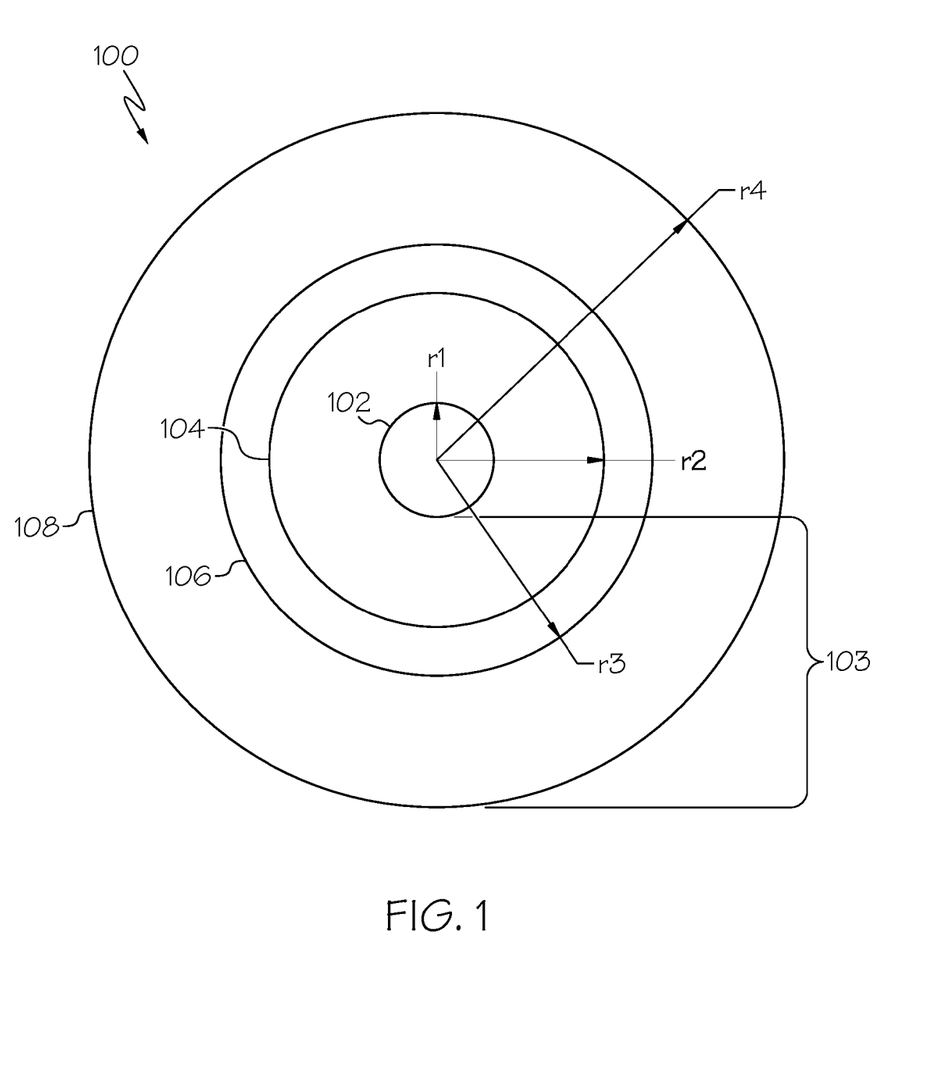
FIG. 1 schematically depicts a radial cross section of a multimode optical fiber according to one or more embodiments shown and described herein.

Reference will now be made in detail to embodiments of multimode optical fibers, examples of which are illustrated in the accompanying drawings. Whenever possible, the same reference numerals will be used throughout the drawings to refer to the same or like parts. A cross section of one embodiment of a multimode optical fiber is schematically depicted in FIG. 1 and is designated generally throughout by the reference numeral 100. In embodiments, the multimode optical fiber generally comprises a core portion having an alpha profile and formed from $SiO_2$ intentionally doped with a single dopant, wherein the single dopant is phosphorous or a compound of phosphorous. A glass cladding portion may surround and be in direct contact with the core portion. The glass cladding portion may be formed from $SiO_2$ and comprise an outer cladding portion and a low-index moat disposed between the core portion and the outer cladding portion. The core portion may have a maximum relative refractive index $\Delta_{1max}\%$ relative to the outer cladding portion. The low-index moat may have a minimum relative refractive index $\Delta_{3min}\%$ relative to the outer cladding portion. $\Delta_{1max}\%$ may be greater than $\Delta_{3min}\%$. The optical fiber may also be multimoded with a bandwidth greater than or equal to 2000 MHz-km for each wavelength within a wavelength operating window centered on a wavelength within an operating wavelength range from about 850 nm to about 1310 nm, the wavelength operating window having a width greater than 100 nm. The optical fiber may also have a restricted launch bend loss less than or equal to 0.5 dB/(2×15 mm diameter mandrel) at 850 nm. Various embodiments of multimode optical fibers and the properties of the multimode optical fibers will be described in further detail herein with specific reference to the appended drawings.

The following terminology will be used in conjunction with the optical fibers described herein:

The term "refractive index profile" or "relative refractive index profile," as used herein, is the relationship between the refractive index or the relative refractive index and the radius R of the fiber.

The term "relative refractive index," as used herein, is defined as:

$$\Delta(r)\% = 100 \times \frac{(n(r)^2 - n_{REF}^2)}{2n(r)^2},$$

where n(r) is the refractive index at radius r of the optical fiber, unless otherwise specified, and r=0 corresponds to the centerline of the fiber. The relative refractive index is defined at 1550 nm unless otherwise specified. In the embodiments described herein, the reference index $n_{REF}$ is the refractive index of the outer cladding. As used herein, the relative refractive index is represented by $\Delta$ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "up-dopant," as used herein, refers to a dopant which raises the refractive index of glass relative to pure, undoped $SiO_2$. The term "down-dopant," as used herein, is a dopant which has a propensity to lower the refractive index of glass relative to pure, undoped $SiO_2$. An up-dopant may be present in a region of an optical fiber having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index.

The term "α-profile" or "alpha profile," as used herein, refers to a relative refractive index profile, expressed in terms of $\Delta$ which is in units of "%," where r is the radius and which follows the equation, $$\Delta = \Delta_{1max}\left[1 - \left(\frac{r}{r_1}\right)^\alpha\right],$$

where $\Delta_{1max}$ is the maximum relative refractive index, $r_1$ is the radius of the core, r is in the range $r_i \leq r \leq r_f$, $\Delta$ is as defined above, $r_i$ is the initial point of the α-profile, $r_f$ is the final point of the α-profile, and α is an exponent which is a real number. For a graded index profile, the alpha value is less than 10. The term "parabolic," as used herein, includes substantially parabolically shaped refractive index profiles which may vary slightly from an α value of 2.0 at one or more points in the core, as well as profiles with minor variations and/or a centerline dip.

Macrobend performance is determined according to FOTP-62 (JEC-60793-1-47) by wrapping 2 turns of optical fiber around a 15 mm and/or a 30 mm diameter mandrel and measuring the increase in attenuation due to the bending using an encircled flux (EF) launch condition (also referred to as a "restricted launch condition"). The encircled flux is measured by launching an overfilled pulse into an input end of a 2 m length of InfiniCor® 50 micron core optical fiber which is deployed with a 1 wrap on a 25 mm diameter mandrel near the midpoint. The output end of the InfiniCor® 50 micron core optical fiber is spliced to the fiber under test, and the measured bend loss is the difference of the attenuation under the prescribed bend condition to the attenuation without the bend.

The overfilled bandwidth is measured according to FOTP-204 using an overfilled launch.

Unless otherwise specified herein, measurements of the properties of the optical fiber are taken at an operating wavelength of at least one of 850 nm, 980 nm, 1060 nm, or 1310 nm, unless otherwise specified.

The terms "microns" and "μm" are used interchangeably herein.

Conventional multimode optical fibers having core portions doped with germanium, such as $GeO_2$, are widely used for short distance communication systems. To minimize the inter-modal dispersion, these conventional multimode optical fibers are designed with graded index α-profiles with an α-value of approximately 2 in order to maximize the bandwidth of the multimode optical fiber at a specific operating wavelength. However, it has been found that the α-value in conventional multimode optical fibers doped with germanium is strongly dependent on the operating wavelength of light propagating in the fiber due to the chromatic dispersion of the material within the germanium-doped core portion of the optical fiber. As a result, the bandwidth of the conventional multimode optical fibers is very sensitive to variations in the α-profile of the core portion away from the optimum α-value. This causes the high bandwidth operating window of the multimode optical fiber to be exceedingly narrow. That is, slight variations in the operating wavelength may dramatically decrease the bandwidth of the multimode optical fiber when the core portion of the fiber is doped with germanium. However, in some applications, such as in applications utilizing wavelength division multiplexing, it is desirable to utilize a multimode optical fiber having a larger bandwidth operating window which is less sensitive to variations in the operating wavelength. For example, in wavelength division multiplexing technology, it is desirable to design a multimode optical fiber with an enlarged wavelength operating window. The multimode optical fibers described herein have a larger wavelength operating window which provides for higher bandwidth operation over a broader range of wavelengths. The multimode optical fibers described herein also have low bend losses which assists in improving system margin and reducing the footprint of the component.

FIG. 1 schematically depicts a cross section of one embodiment of an optical fiber. The optical fibers described herein are multimode optical fibers meaning that the fibers support the propagation of multiple modes of electromagnetic radiation at wavelengths up to and including 1310 nm or even greater. The multimode optical fibers generally comprise a core portion and a cladding portion comprising at least a low-index moat and an outer cladding portion. In some embodiments, the cladding portion of the multimode optical fibers may further include an inner cladding portion positioned between the core portion and the low-index moat, as depicted in FIG. 1. However, it should be understood that the inner cladding portion is optional and that, in some embodiments, the multimode optical fiber may be formed without the inner cladding portion. The structure and composition of the multimode optical fibers as well as the properties of the multimode optical fibers will be described in more detail herein.

Figure 2:
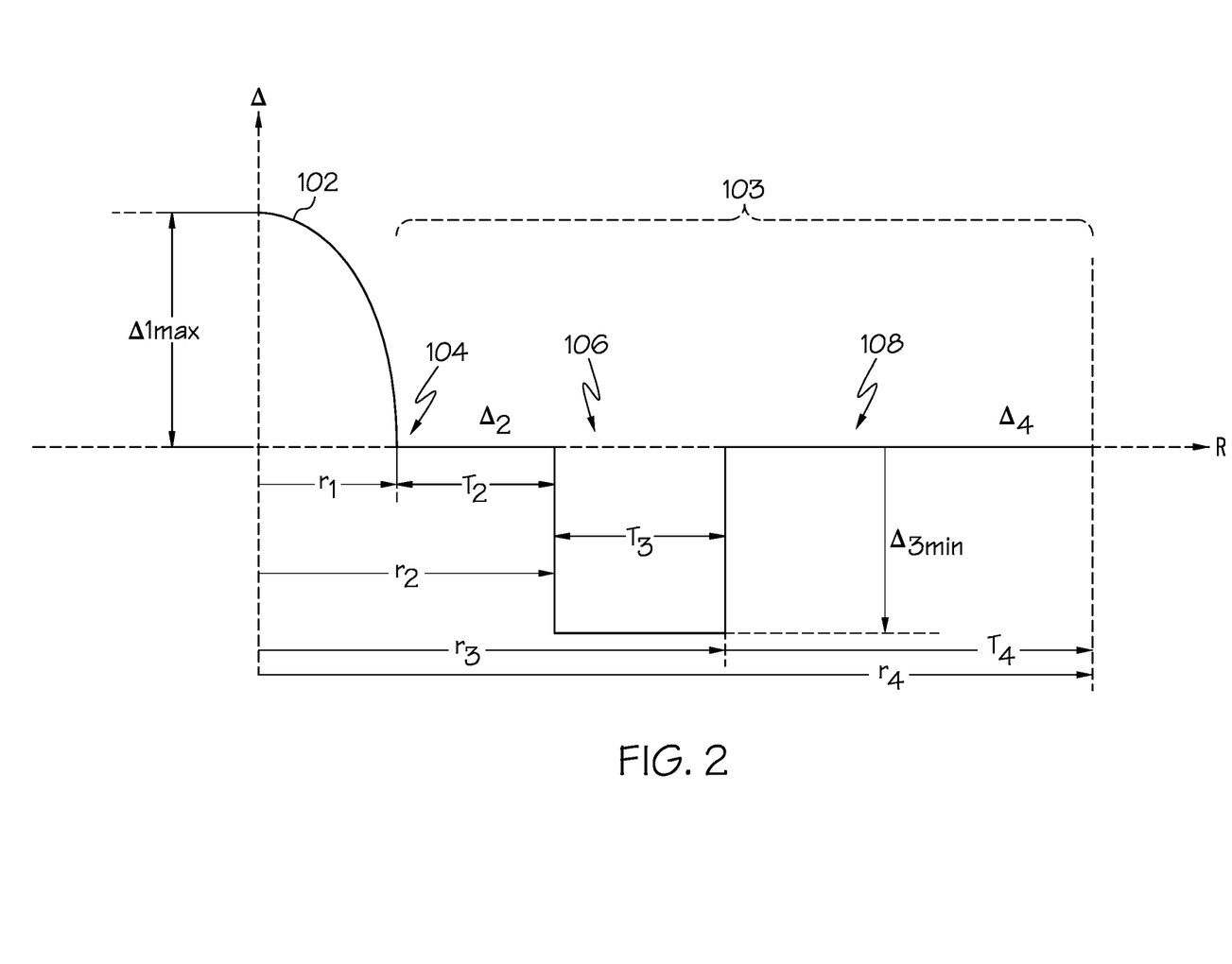
FIG. 2 graphically depicts the relative refractive index profile of the multimode optical fiber of FIG. 1 as a function of the radius R of the glass portion of the multimode optical fiber.

Referring to FIGS. 1 and 2, a cross section of one embodiment of a multimode optical fiber 100 (FIG. 1) and the corresponding relative refractive index profile (FIG. 2) of the multimode optical fiber 100 are depicted. The multimode optical fiber 100 generally comprises a core portion 102 and a cladding portion 103. In the embodiments described herein, the core portion 102 is positioned within the cladding portion 103. The core portion 102 and the cladding portion 103 are concentric such that the cross section of the multimode optical fiber 100 is generally circular symmetric with respect to the center of the core portion 102. The cladding portion 103 comprises a low-index moat 106 and an outer cladding portion 108. The low-index moat 106 and the outer cladding portion 108 are arranged such that the low-index moat 106 is disposed between the core portion 102 and the outer cladding portion 108. In the embodiments described herein, the outer cladding portion 108 is in direct contact with the low-index moat 106.

In some embodiments, the cladding portion 103 may further comprise an inner cladding portion 104 positioned between the core portion 102 and the low-index moat 106. In these embodiments, the inner cladding portion 104 is in direct contact with both the core portion 102 and the low-index moat 106. While FIG. 1 depicts the cladding portion 103 as comprising an inner cladding portion 104, a low-index moat 106, and an outer cladding portion 108, it should be understood that, in other embodiments, the cladding portion 103 may be formed without the inner cladding portion 104, such as when the low-index moat 106 surrounds and is in direct contact with the core portion 102 of the multi-mode optical fiber 100.

Still referring to FIGS. 1 and 2, the core portion 102 has a radius $r_1$. The inner cladding portion 104, when present, may surround the core portion 102 and extend from the radius $r_1$ to the radius $r_2$ such that the inner cladding portion 104 has a radial thickness $T_2=r_2-r_1$. The low-index moat 106 surrounds the core portion 102 and the inner cladding portion 104 and extends from the radius $r_2$ to the radius $r_3$ such that the low-index moat has a radial thickness $T_3=r_3-r_2$. The outer cladding portion 108 may surround the low-index moat 106 and extend from the radius $r_3$ to the radius $r_4$ such that the outer cladding has a radial thickness of $T_4=r_4-r_3$. Accordingly, the glass portion of the optical fiber 100 (e.g., the core portion 102, the inner cladding portion 104, the low-index moat 106, and the outer cladding portion 108) may have a diameter of $2r_4$. In some embodiments described herein, the diameter of the glass portion of the optical fiber is greater than 50 μm. In some other embodiments, the diameter of the glass portion of the optical fiber is greater than 60 μm. In these embodiments, the diameter of the glass portion of the optical fiber is less than 150 μm. For example, in some embodiments, the diameter of the glass portion of the optical fiber may be greater than 100 μm and less than 130 microns. In particular embodiments, the diameter of the glass portion of the optical fiber is 125 μm.

In the embodiments described herein, the core portion 102, the inner cladding portion 104 (when present), the low-index moat 106 and the outer cladding portion 108 generally comprise silica, specifically silica glass.

The core portion 102 has an index of refraction $n_1$ and is formed with a graded index profile (i.e., an alpha profile). For example, in the embodiments of the multimode optical fiber 100 described herein, the core portion 102 has an alpha profile, as is graphically depicted in FIG. 2. As such, the core portion 102 has a maximum relative refractive index $\Delta_{1max}\%$ relative to the outer cladding portion 108 proximate to the center of the core portion 102. Although not depicted in FIG. 2, in some embodiments, the refractive index of the core portion 102 may have a centerline dip such that the maximum refractive index of the core portion 102 and the maximum refractive index of the entire multimode optical fiber 100 is located a small distance away from the centerline of the core portion 102 rather than at the centerline of the core portion 102, as depicted in FIG. 2. In the embodiment of the multimode optical fiber 100 depicted in FIG. 2, the relative refractive index of the core portion 102 decreases with increasing radius from the center of the core portion 102. In the embodiments described herein, the core portion 102 has an alpha value (i.e., α) which is greater than or equal to 1.95 and less than or equal to 2.15. In some embodiments the alpha value is greater than or equal to 1.98 and less than or equal to 2.05. In some other embodiments the alpha value is greater than or equal to 2.0 and less than or equal to 2.1.

The inner cladding has an index of refraction $n_2$ and a corresponding relative refractive index percent $\Delta_2\%$ relative to the outer cladding portion 108. The low-index moat 106 may have an index of refraction $n_3$ and a corresponding minimum relative refractive index percent $\Delta_{3min}\%$ relative to the outer cladding portion 108. In the embodiments described herein, $n_1 > n_2 > n_3$ and $\Delta_{1max}\% > \Delta_2\% > \Delta_{3min}\%$ as generally depicted in FIG. 2. The depressed relative refractive index of the low-index moat 106 relative to the core portion 102 improves the bend resistance of the multimode optical fiber 100.

The outer cladding portion 108 of the multimode optical fiber 100 may comprise an index of refraction $n_4$ and a relative refractive index $\Delta_4\%$ relative to pure silica glass. Because the refractive index of the outer cladding portion is used as the reference for the relative refractive indices of the other glass portions of the multimode optical fiber, the relative refractive index of the outer cladding portion 108 is determined relative to itself and, as such, is zero (i.e., $\Delta_4\%=0$) relative to itself. In the embodiments described herein, the relative refractive index $\Delta_4\%$ of the outer cladding portion 108 is greater than the minimum relative refractive index $\Delta_{3min}\%$ of the low-index moat 106 (e.g., $\Delta_4\% > \Delta_{3min}\%$). In some embodiments, the relative refractive index $\Delta_4\%$ of the outer cladding portion 108 may be greater than the relative refractive index $\Delta_2\%$ of the inner cladding portion 104, such as when the outer cladding portion 108 comprises silica glass up-doped with one or more up-dopants which increase the index of refraction $n_4$ of the outer cladding portion 108 relative to the inner cladding portion 104. In these embodiments, increasing the index of refraction of the outer cladding portion relative to the inner cladding portion aids in reducing the impact of any profile errors in the regions outside the core portion 102, thereby improving the bandwidth of the multimode optical fiber 100. In another embodiment, the relative refractive index $\Delta_4\%$ of the outer cladding portion 108 may be equal to the relative refractive index $\Delta_2\%$ of the inner cladding portion 104. In this embodiment, the composition of the outer cladding portion 108 may be the same as the composition of the inner cladding portion 104 or different than the composition of the inner cladding portion 104, so long as $\Delta_4\% = \Delta_2\%$. Based on the foregoing, it should be understood that the relative refractive index $\Delta_4\%$ of the outer cladding portion 108 is greater than or equal to the relative refractive index $\Delta_2\%$ of the inner cladding portion 104.

In the embodiments of the multimode optical fibers described herein, the optical fibers can be drawn from a finished preform and, thereafter, coated with, for example, conventional primary and secondary urethane acrylate coatings.

The radius $r_1$ of the core portion 102 is from about 12.5 μm to about 50 μm. In some embodiments, the radius $r_1$ of the core portion 102 may be from about 20 μm to about 40 μm.

In the embodiments of the multimode optical fibers described herein, the core portion 102 comprises silica glass ($SiO_2$) intentionally up-doped with a single dopant, specifically phosphorous or a compound of phosphorous, such as $P_2O_5$ or the like. It has been determined that up-doping the core portion 102 with phosphorous or a compound of phosphorous as the single dopant in the core portion 102 reduces the sensitivity of the bandwidth of the optical fiber to variations in wavelength. Specifically, it has been found that silica-based glass doped with phosphorous has a smaller chromatic dispersion coefficient which, in turn, reduces the sensitivity of the α-value of the glass to changes in wavelength, providing for higher bandwidths over a broader range of operating wavelengths.

In embodiments, the core portion 102 of the multimode optical fiber is up-doped with phosphorous or a compound of phosphorus, such as $P_2O_5$, such that the maximum relative refractive index $\Delta_{1max}\%$ of the core portion 102 is greater than or equal to 0.5% and less than or equal to 2.0%. In some embodiments, the core portion 102 is up-doped with $P_2O_5$ such that the maximum relative refractive index $\Delta_{1max}\%$ of the core portion 102 is greater than or equal to 0.75% and less than or equal to 1.25%. In order to obtain these values for the maximum relative refractive index $\Delta_{1max}\%$ of the core portion 102, the core portion 102 may contain from about 19 wt. % to about 33 wt. % $P_2O_5$. In some embodiments, the core portion 102 may contain from about 22 wt. % to about 30 wt. % $P_2O_5$. In some other embodiments, the core portion 102 may contain from about 23 wt. % to about 29 wt. % $P_2O_5$. In still other embodiments, the core portion 102 may contain from about 25 wt. % to about 29 wt. % $P_2O_5$. For example, in one embodiment, the core portion 102 may comprise about 26.0 wt. % $P_2O_5$ such that the maximum relative refractive index $\Delta_{1max}\%$ of the core portion 102 is about 1% at an operating wavelength of 850 nm. It should be understood that the specific concentration of phosphorous in the core portion may be varied according to the desired center operating wavelength.

As discussed above, the inner cladding portion 104 has a radial thickness $T_2$ defined by $r_2 - r_1$. In the embodiments described herein the radial thickness $T_2$ of the inner cladding portion 104 may be greater than or equal to about 0.5 μm and less than or equal to about 4 μm. In some embodiments, the radial thickness $T_2$ of the inner cladding portion 104 may be greater than or equal to about 0.5 μm and less than or equal to about 3 μm. In some embodiments, the radial thickness $T_2$ of the inner cladding portion 104 may be greater than or equal to about 1.0 μm and less than or equal to about 2 μm. In some embodiments (not shown), the radial thickness $T_2$ is zero, such as when the inner cladding portion is not present and the core portion is in direct contact with the low index moat. In these embodiments, the α-profile of the core portion extends to the low index moat.

In some embodiments the inner cladding portion 104 comprises pure silica glass ($SiO_2$) and the outer cladding 108 comprises silica glass with one or more up-dopants which increase the index of refraction of silica glass, such as, for example, germanium, titanium, aluminum, chlorine, phosphorous or the like. As used herein, the phrase "pure silica glass" means that the silica glass comprises $SiO_2$ with less than 1000 ppm by weight of other elements. In some other embodiments the inner cladding portion 104 comprises silica glass with one or more down-dopants which decrease the index of refraction of silica glass, such as, for example, fluorine, boron, or the like. In the embodiments described herein, the inner cladding portion 104 of the multimode optical fiber 100 is formed such that the relative refractive index $\Delta_2\%$ of the inner cladding portion 104 is greater than or equal to about −0.2% and less than or equal to about 0.1% relative to the outer cladding portion 108. In some other embodiments, the relative refractive index $\Delta_2\%$ of the inner cladding portion 104 is greater than or equal to about −0.2% and less than or equal to about 0% relative to the outer cladding portion 108. For example, in embodiments where the outer cladding portion 108 is formed from un-doped silica glass, the inner cladding portion 104 may also be formed from un-doped silica glass such that the relative refractive index $\Delta_2\%$ is approximately zero or less than zero. In some other embodiments the inner cladding portion 104 may be formed from silica glass down-doped with from about 0.1 wt. % up to about 0.7 wt. % fluorine such that the relative refractive index $\Delta_2\%$ is less than or equal to about 0%. In some embodiments, the concentration of fluorine in the inner cladding portion may be greater than about 0.1 wt. % and less than about 1.8 wt. %. In some other embodiments, the concentration of fluorine in the inner cladding portion may be greater than about 0.1 wt. % and less than about 1.5 wt. %. In still other embodiments, the concentration of fluorine in the inner cladding portion may be greater than about 0.5 wt. % and less than about 1.8 wt. %. In yet other embodiments, the concentration of fluorine in the inner cladding portion may be greater than about 0.7 wt. % and less than about 1.8 wt. %. In embodiments where the inner cladding portion 104 is down-doped relative to the outer cladding portion 108, the decreased index of refraction of the inner cladding portion 104 relative to the outer cladding portion 108 aids in reducing the impact of any profile errors in the regions outside the core portion 102, thereby improving the bandwidth of the multimode optical fiber 100, as described above.

The radial thickness $T_3$ (e.g., $r_3$-$r_2$) of the low-index moat 106 is greater than or equal to about 2 μm and less than or equal to about 20 μm. In some embodiments, the radial thickness $T_3$ of the low-index moat 106 is greater than or equal to about 4 μm and less than or equal to about 10 μm. In some other embodiments, the radial thickness $T_3$ of the low-index moat 106 is greater than or equal to about 4 μm and less than or equal to about 7 μm. The radial thickness of the low-index moat 106 may be interrelated with the minimum relative refractive index $\Delta_{3min}\%$ of the low-index moat 106.

Specifically, the low-index moat 106 may have a moat volume $V_3$ defined as:

$$V_3 = 2\int_{r_2}^{r_3} \Delta_{3min}\%(r)dr,$$

which may be rewritten as:

$$V_3 = \Delta_{3\ min}\%(r_3^2 - r_2^2).$$

In the embodiments described herein, the moat volume $V_3$ may be greater than or equal to about 80%-μm², such as greater than or equal to about 100%-μm². In some embodiments, the moat volume $V_3$ may be greater than or equal to about 110%-μm² or even greater than or equal to about 120%-μm². In some embodiments, the moat volume $V_3$ may be greater than or equal to about 80%-μm² and less than or equal to about 220%-μm². In some embodiments, the moat volume $V_3$ may be greater than or equal to about 100%-μm² and less than or equal to about 200%-μm². In still other embodiments, the moat volume profile $V_3$ may be greater than or equal to about 110%-μm² and less than or equal to about 180%-μm².

In the embodiments of the multi-mode optical fibers described herein, the low-index moat 106 has a minimum relative refractive index $\Delta_{3min}\%$ less than or equal to about −0.1% and greater than or equal to about −1.0%. In some embodiments, the down-dopants are added to the silica glass of the low-index moat 106 such that the low-index moat 106 has a minimum relative refractive index $\Delta_{3min}\%$ less than or equal to about −0.3% and greater than or equal to about −0.7%. In some embodiments, the down-dopants are added to the silica glass of the low-index moat 106 such that the low-index moat 106 has a minimum relative refractive index $\Delta_{3min}\%$ less than or equal to about −0.4% and greater than or equal to about −0.6%. In some embodiments the low-index moat is fluorine down doped silica comprising from about 0.1 wt. % to about 2.5 wt. % fluorine, such that the relative refractive index $\Delta_{3min}\%$ is less than or equal to about 0%. In some embodiments, the low index moat comprises fluorine in a concentration greater than or equal to about 0.1 wt. % to less than or equal to about 1.8 wt. %. In some other embodiments, the low index moat comprises fluorine in a concentration greater than or equal to about 0.1 wt. % to less than or equal to about 1.5 wt. %. In still other embodiments, the low index moat comprises fluorine in a concentration greater than or equal to about 0.5 wt. % to less than or equal to about 1.8 wt. %. In still other embodiments, the low index moat comprises fluorine in a concentration greater than or equal to about 0.7 wt. % to less than or equal to about 1.8 wt. %.

In some embodiments, the minimum relative refractive index $\Delta_{3min}\%$ of the low-index moat 106 is achieved by forming the low-index moat 106 with voids which are either non-periodically disposed, or periodically disposed, or both, throughout the low-index moat 106. The phrase "non-periodically disposed" or "non-periodic distribution", as used herein, means that for a cross section of the multimode optical fiber 100 (such as a cross section perpendicular to the longitudinal axis), the non-periodically disposed voids are randomly or non-periodically distributed across the low-index moat 106 of the fiber. Similar cross sections taken at different points along the length of the fiber will have different cross-sectional void patterns. That is, various cross sections will have different void patterns, wherein the distribution of voids and the sizes of voids do not match when the cross sections are compared to one another. As such, the voids are non-periodically disposed within the fiber structure. These voids are stretched (elongated) along the length (i.e. parallel to the longitudinal axis) of the multimode optical fiber, but do not extend the entire length of the entire fiber. While not wishing to be bound by theory, it is believed that the voids extend less than a few meters, and in many cases less than 1 meter along the length of the fiber. Multimode optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. In some embodiments, these voids may contain one or more gases, such as argon, krypton, $CO_2$, $SO_2$, $O_2$, or mixtures thereof. In some other embodiments, the voids are substantially free of gas. Regardless of the presence or absence of gas, the refractive index of the low-index moat 106 (and the corresponding minimum relative refractive index $\Delta_{3min}\%$) is decreased due to the presence of the voids.

Alternatively or additionally, the minimum relative refractive index $\Delta_{3min}\%$ of the low-index moat 106 may be achieved by forming the low-index moat 106 from silica glass down-doped to lower the index of refraction $n_3$ of the low-index moat 106 with respect to pure silica glass. In some embodiments, the low-index moat 106 may comprise silica glass down-doped with fluorine, as described hereinabove. In some other embodiments, the low-index moat 106 may comprise silica glass down-doped with fluorine and at least one other down-dopant. In still other embodiments, the low-index moat 106 may comprise silica glass down-doped with fluorine and containing a non-periodic distribution of voids, as described herein.

The low-index moat 106 may also comprise silica glass down-doped with fluorine and at least one another down-dopant. For example, in some embodiments, the low-index moat 106 may be down-doped with a combination of fluorine and boron. For example, the low-index moat 106 may comprise from about 0.5 wt. % to about 2.4 wt. % F and from about 0.5 wt. % to about 10 wt. % $B_2O_3$.

Still referring to FIGS. 1 and 2, the radial thickness $T_4$ (e.g., $r_4$-$r_3$) of the outer cladding portion 108 is greater than or equal to about 10 µm and less than or equal to about 40 µm. In some embodiments, the radial thickness $T_4$ of the outer cladding portion is greater than or equal to about 15 µm and less than or equal to about 35 µm. In some other embodiments, the radial thickness $T_4$ of the outer cladding portion 108 is greater than or equal to about 20 µm and less than or equal to about 35 µm. In the embodiments described herein, the outer cladding portion 108 may generally comprise a radial thickness $T_4$ such that the outer diameter (i.e., $2r_4$) of the multimode optical fiber is as described herein.

The relative refractive index $\Delta_4\%$ of the outer cladding portion 108 is generally less than the maximum relative refractive index $\Delta_{1max}\%$ of the core portion 102 and greater than the minimum relative refractive index $\Delta_{3min}\%$ of the low-index moat 106 (i.e., $\Delta_{1max}\%>\Delta_4\%>\Delta_{3min}\%$). In embodiments where the multimode optical fiber 100 comprises an inner cladding portion, the relative refractive index $\Delta_4\%$ of the outer cladding portion 108 is greater than or approximately equal to the relative refractive index $\Delta_2\%$ of the inner cladding portion 104 (i.e., $\Delta_4\%>\Delta_2\%$), as noted above. In embodiments where the outer cladding portion 108 is up-doped relative to the inner cladding portion 104, the increased index of refraction of the outer cladding portion 108 relative to the inner cladding portion 104 aids in reducing the impact of any profile errors in the regions outside the core portion 102, thereby improving the bandwidth of the multimode optical fiber 100.

In some embodiments the outer cladding portion 108 may comprise pure silica glass. In some other embodiments, the outer cladding portion 108 may comprise silica glass up-doped with one or more up-dopants or silica glass down-doped with one or more down dopants so long as $\Delta_{1max}\%>\Delta_4\%>\Delta_{3min}\%$ and $\Delta_4\%\geq\Delta_2\%$. For example, in one embodiment, the outer cladding portion 108 may generally have the same composition as the inner cladding portion 104. Alternatively, the outer cladding portion 108 may have a different composition than the inner cladding portion 104. Suitable up-dopants for increasing the index of refraction of the outer cladding portion 108 relative to pure silica glass may include, for example and without limitation, Cl, $GeO_2$, $TiO_2$, and/or various combinations thereof. Suitable down-dopants for decreasing the index of refraction of the outer cladding portion 108 relative to pure silica glass may include, for example and without limitation, F, $B_2O_3$, and/or various combinations thereof.

As noted above, the multimode optical fibers described herein have an increased wavelength operating window which provides for higher bandwidth operation of the multimode optical fiber over a broad range of wavelengths. This increase in the wavelength operating window is attributable to the core portion of the multimode optical fiber being intentionally up-doped with a single dopant, specifically phosphorous or a compound of phosphorous such as $P_2O_5$, which decreases the sensitivity of the bandwidth of the multimode optical fiber to variations in wavelength. Specifically, phosphorous-doped silica glass has a relatively small dispersion coefficient compared to, for example, silica glass doped with only germania. The relatively small dispersion coefficient reduces the sensitivity of the α-value of the glass to changes in wavelength. Said differently, the addition of phosphorous to the core portion of the optical fiber decreases the sensitivity of the bandwidth of the core portion to variations in wavelength, enabling the multimode optical fiber to operate at relatively high bandwidths over a relatively broader range of wavelengths (i.e., the fibers have an enlarged wavelength operating window).

Figure 3A:
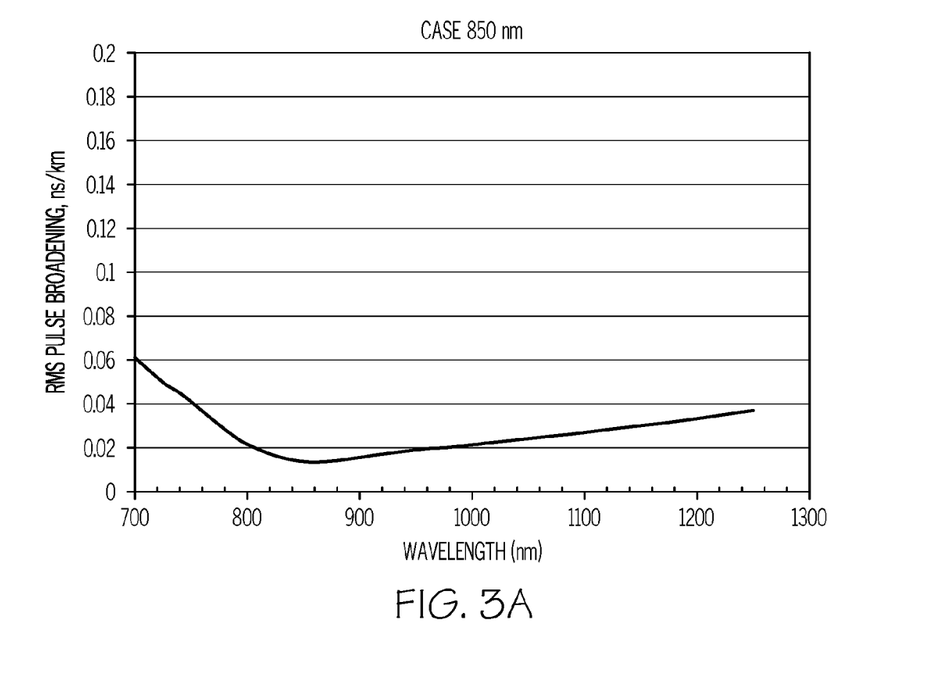
FIG. 3A graphically depicts the RMS delay (y-ordinate) as a function of wavelength (x-ordinate) for a multimode optical fiber having a phosphorous-doped core portion optimized for an operating wavelength of 850 nm.
Figure 3B:
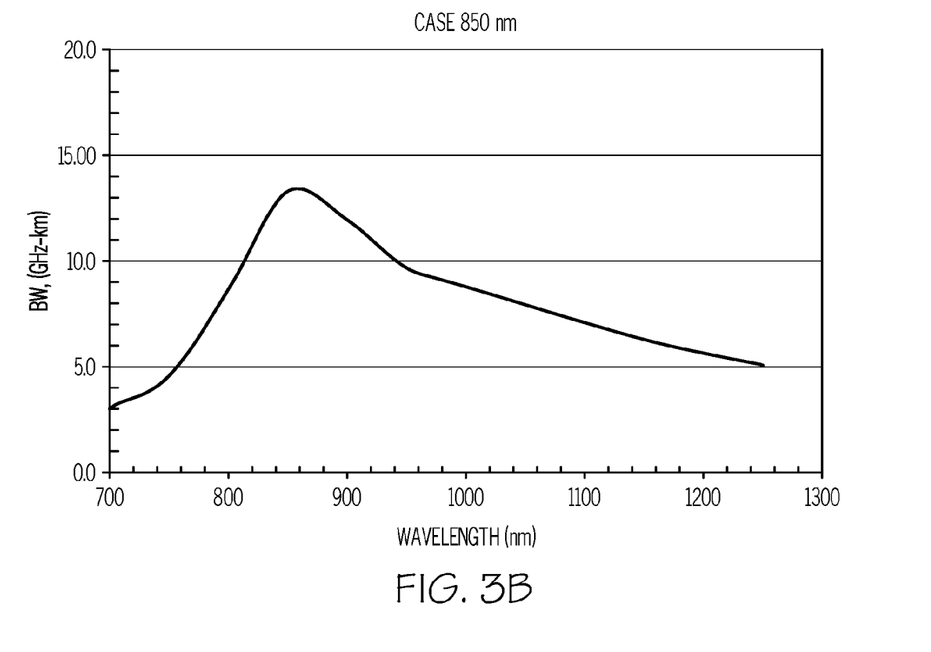
FIG. 3B graphically depicts the bandwidth (y-ordinate) as a function of wavelength (x-ordinate) for the multimode optical fiber of FIG. 3A.
Figure 4A:
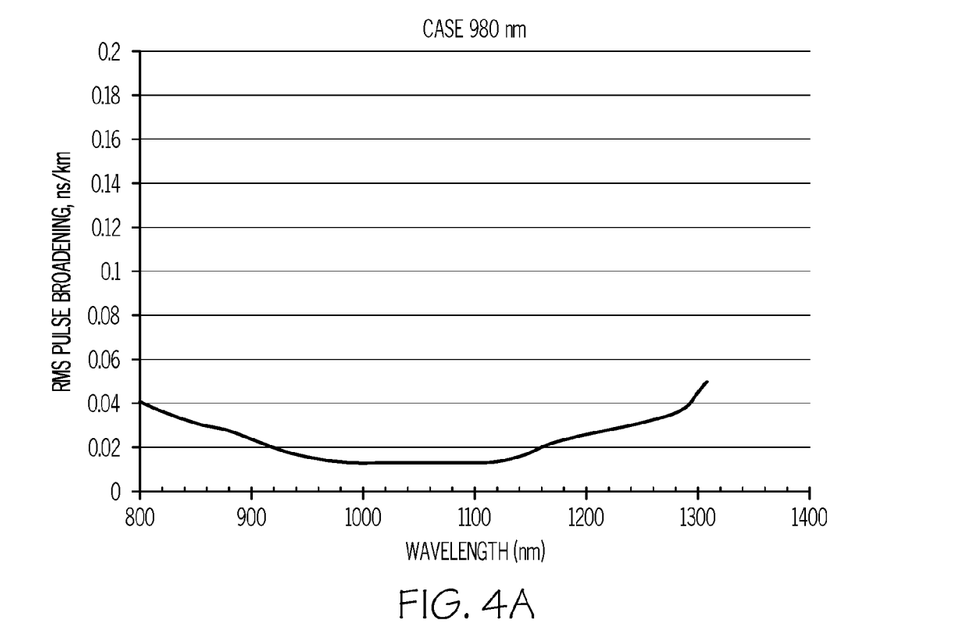
FIG. 4A graphically depicts the RMS delay (y-ordinate) as a function of wavelength (x-ordinate) for a multimode optical fiber having a phosphorous-doped core portion optimized for an operating wavelength of 980 nm.
Figure 4B:
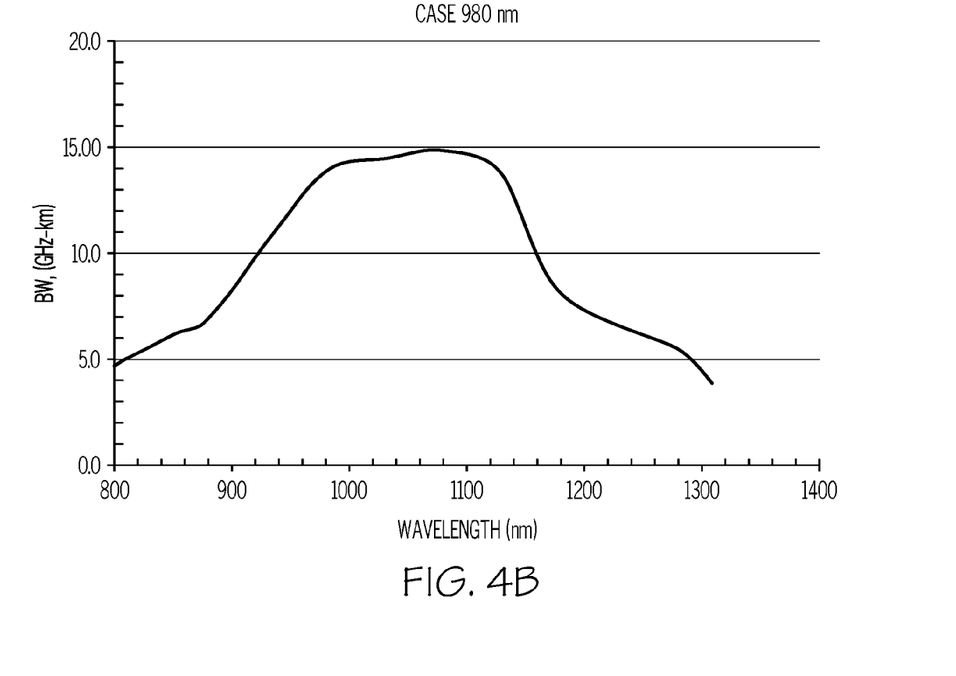
FIG. 4B graphically depicts the bandwidth (y-ordinate) as a function of wavelength (x-ordinate) for the multimode optical fiber of FIG. 4A.
Figure 5A:
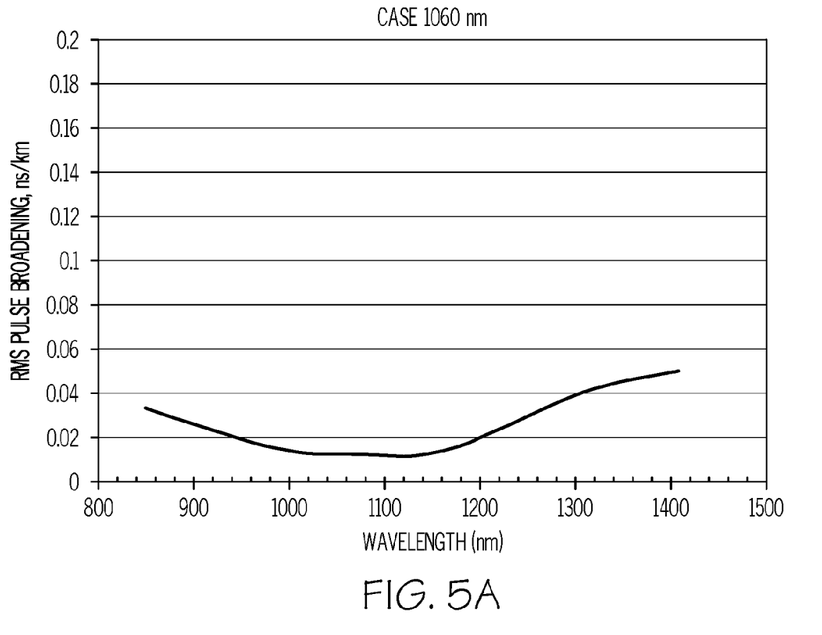
FIG. 5A graphically depicts the RMS delay (y-ordinate) as a function of wavelength (x-ordinate) for a multimode optical fiber having a phosphorous-doped core portion optimized for an operating wavelength of 1060 nm.
Figure 5B:
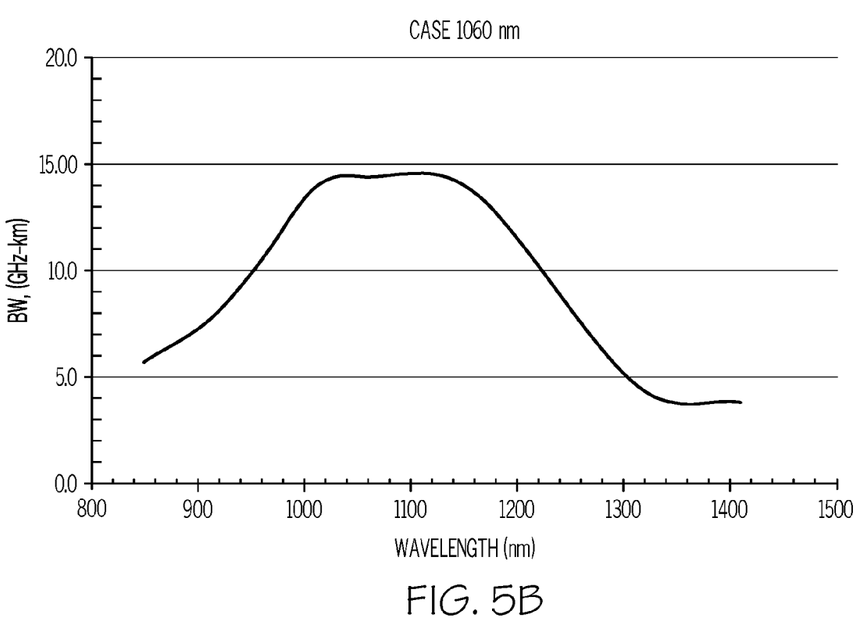
FIG. 5B graphically depicts the bandwidth (y-ordinate) as a function of wavelength (x-ordinate) for the multimode optical fiber of FIG. 5A.
Figure 6A:
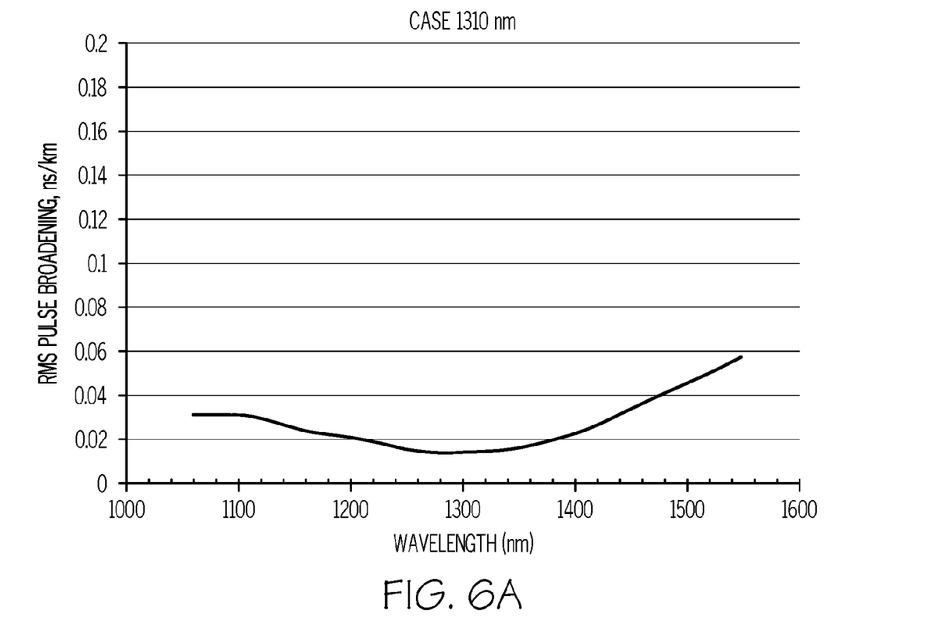
FIG. 6A graphically depicts the RMS delay (y-ordinate) as a function of wavelength (x-ordinate) for a multimode optical fiber having a phosphorous-doped core portion optimized for an operating wavelength of 1310 nm.
Figure 6B:
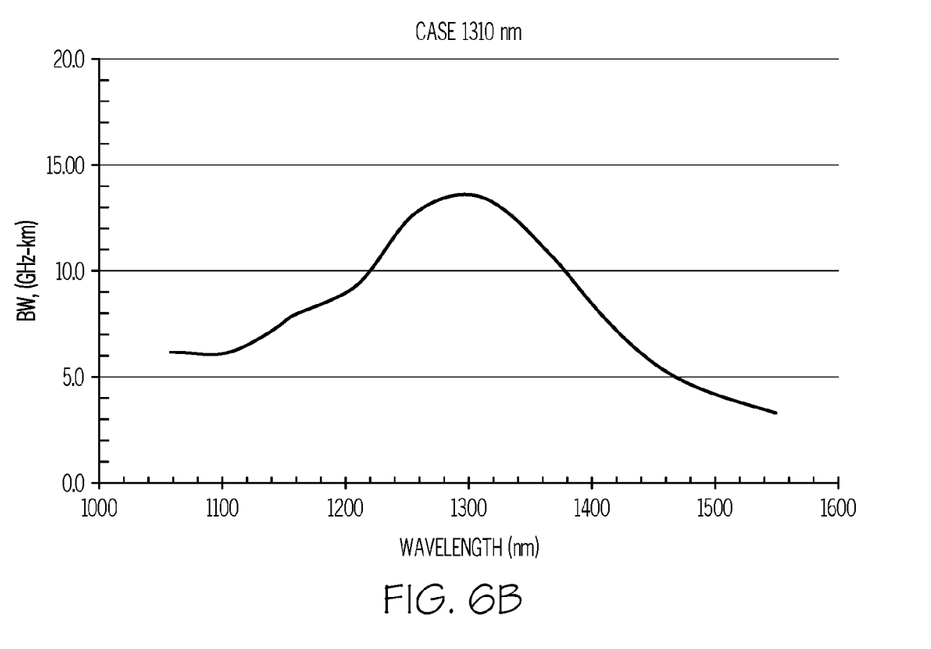
FIG. 6B graphically depicts the bandwidth (y-ordinate) as a function of wavelength (x-ordinate) for the multimode optical fiber of FIG. 6A.

In the embodiments described herein, the multimode optical fibers have a bandwidth greater than or equal to 2000 MHz-km (2 GHz-km) for each wavelength within a wavelength operating window having a width greater than 100 nm. The wavelength operating window may be centered on at least one wavelength within an operating wavelength range from about 850 nm to about 1310 nm. For example, in one embodiment, the width of the wavelength operating window may be 200 nm and the wavelength operating window may be centered at an operating wavelength of 850 nm (i.e., the wavelength operating window extends from 750 nm to 950 nm). In this example, multimode optical fiber will have a bandwidth of greater than 2 GHz-km for wavelengths of light from about 750 nm to about 950 nm propagating within the optical fiber (See, e.g., Example 1, FIG. 3B). In embodiments, the wavelength operating window may be centered on at least one of 850 nm, 980 nm, 1060 nm, and 1310 nm. In some embodiments, the multimode optical fibers have a bandwidth greater than 3000 MHz-km (3 GHz-km) or even greater than 4000 MHz-km (4 GHz-km) within the wavelength operating window. In some other embodiments, the multimode optical fibers have a bandwidth greater than 4700 MHz-km (4.7 GHz-km) within the wavelength operating window. In some embodiments, the wavelength operating window may have a width greater than about 150 nm or even greater than about 200 nm.

In some embodiments, the multimode optical fibers described herein have a bandwidth of greater than 2000 MHz-km (2.0 GHz-km), or greater than 4000 MHz-km (4 GHz-km), or greater than 4700 MHz-km (4.7 GHz-km), or greater than 6000 MHz-km (6 GHz-km), or greater than 8000 MHz-km (8 GHz-km), or greater than 10000 MHz-km (10 GHz-km) at an operating wavelength of 850 nm. In some other embodiments, the multimode optical fibers described herein have a bandwidth of greater than 2000 MHz-km (2.0 GHz-km)), or greater than 4000 MHz-km (4 GHz-km), or greater than 4700 MHz-km (4.7 GHz-km), or greater than 6000 MHz-km (6 GHz-km), or greater than 8000 MHz-km (8 GHz-km), or greater than 10000 MHz-km (10 GHz-km) at an operating wavelength of 980 nm. In other embodiments, the multimode optical fibers described herein have a bandwidth of greater than 2000 MHz-km (2.0 GHz-km)), or greater than 4000 MHz-km (4 GHz-km), or greater than 4700 MHz-km (4.7 GHz-km), or greater than 6000 MHz-km (6 GHz-km), or greater than 8000 MHz-km (8 GHz-km), or greater than 10000 MHz-km (10 GHz-km) at an operating wavelength of 1060 nm. In still other embodiments, the multimode optical fibers described herein have a bandwidth of greater than 2000 MHz-km (2.0 GHz-km)), or greater than 3000 MHz-km (3 GHz-km), or greater than 4000 MHz-km (4 GHz-km), or even greater than 4700 MHz-km (4.7 GHz-km) at an operating wavelength of 1300 nm.

The various embodiments of the multimode optical fiber 100 described herein have improved bend performance due to the incorporation of the low-index moat 106 within the cladding portion 103. In embodiments, the macrobend loss using restricted mode launch (core only) of the multimode optical fibers described herein is less than or equal to 0.5 dB/(2 turns around a 15 mm diameter mandrel) and 0.3 dB/(2 turns around a 30 mm diameter mandrel) at operating wavelengths of 850 nm, 980 nm, 1060 nm, and/or 1310 nm. That is, the macrobend loss is less than or equal to 0.5 dB/(2 turns around a 15 mm diameter mandrel) and 0.3 dB/(2 turns around a 30 mm diameter mandrel) at one, some, or all of these wavelengths when tested according to the macrobend test described herein. In some embodiments, the macrobend loss is less than or equal to 0.2 dB/(2 turns around a 15 mm diameter mandrel) and 0.1 dB/(2 turns around a 30 mm diameter mandrel) at operating wavelengths of 850 nm, 980 nm, 1060 nm, and/or 1310 nm. That is, the macrobend loss is less than or equal to 0.2 dB/(2 turns around a 15 mm diameter mandrel) and 0.1 dB/(2 turns around a 30 mm diameter mandrel) at one, some, or all of these wavelengths when tested according to the macrobend test described herein.

EXAMPLES

The embodiments described herein will be further clarified by the following examples.

Four multimode optical fiber designs with phosphorous-doped cores were modeled for different center wavelengths (i.e., 850 nm, 980 nm, 1060 nm, and 1310 nm) within a wavelength operating window. Each multimode optical fiber was modeled with a core portion, a low-index moat portion, an inner cladding portion separating the low-index moat portion from the core portion, and an outer cladding portion, as schematically depicted in FIG. 1. The multimode optical fibers were modeled as if the core portions were doped with 26 wt. % of $P_2O_5$. The dimensional characteristics and relative refractive indexes of the core portion and the low-index moat are listed in Table 1 below for each of the modeled multimode optical fibers having a diameter of 125 μm. The modeled macrobend loss values at various wavelengths and bend diameters are also listed in Table 1.

The RMS (root mean square) delay and bandwidth for each of the modeled optical fibers were then calculated. The RMS delay can be used to approximate the bandwidth according to the following relationship:

Bandwidth (MHz-km)=187/RMS delay (ns/km)

The RMS delay and bandwidth for each of the modeled multimode optical fibers are graphically depicted in FIGS. 3A-6B as a function of wavelength. As shown in each of FIGS. 3A, 4A, 5A, and 6A, the RMS delay is a minimum at the center wavelength of the wavelength operating window for which the multimode optical fiber was designed and gradually increases for wavelengths adjacent to the center wavelength. Further, as shown in FIGS. 3B, 4B, 5B, and 6B, the peak bandwidth of the multimode optical fiber generally occurs at the center wavelength of the wavelength operating window for which the multimode optical fiber was designed.

In all of the modeled multimode optical fibers, the bandwidth was greater than 2 GHz-km within a 150 nm wavelength operating window centered on the center wavelength.

TABLE 1

Multimode Optical Fiber Design Examples

| | Example 1 | Example 2 | Example 3 | Example 4 |
|---|---|---|---|---|
| Center Wavelength (nm) | 850 | 980 | 1060 | 1310 |
| $\Delta_{1max}$ (%) | 1.0 | 1.0 | 1.0 | 1.0 |
| $\Delta_{3min}$ (%) | −0.48 | −0.48 | −0.475 | −0.469 |
| $r_1$ (μm) | 24.3 | 24.3 | 24.3 | 24.3 |
| $r_2$ (μm) | 25.70 | 25.81 | 25.85 | 26.0 |
| $r_3$ (μm) | 30.7 | 30.81 | 30.85 | 31.0 |
| $T_2$ (μm) | 1.40 | 1.51 | 1.55 | 1.70 |
| $T_3$ (μm) | 5.0 | 5.0 | 5.0 | 5.0 |
| Core α | 2.023 | 2.019 | 2.021 | 2.033 |
| Macrobend loss at 850 nm (dB/(2 × 15 mm dia. mandrel)) | <0.2 | <0.2 | <0.2 | <0.2 |
| Macrobend loss at 850 nm (dB/(2 × 30 mm dia. mandrel)) | <0.1 | <0.1 | <0.1 | <0.1 |
| Macrobend loss at 980 nm (dB/(2 × 15 mm dia. mandrel)) | <0.2 | <0.2 | <0.2 | <0.2 |
| Macrobend loss at 980 nm (dB/(2 × 30 mm dia. mandrel)) | <0.1 | <0.1 | <0.1 | <0.1 |
| Macrobend loss at 1060 nm (dB/ (2 × 15 mm dia. mandrel)) | <0.2 | <0.2 | <0.2 | <0.2 |
| Macrobend loss at 1060 nm (dB/ (2 × 30 mm dia. mandrel)) | <0.1 | <0.1 | <0.1 | <0.1 |
| Macrobend loss at 1310 nm (dB/ (2 × 15 mm dia. mandrel)) | <0.2 | <0.2 | <0.2 | <0.2 |
| Macrobend loss at 1310 nm (dB/ (2 × 30 mm dia. mandrel)) | <0.1 | <0.1 | <0.1 | <0.1 |

COMPARATIVE EXAMPLE

For purposes of comparison, a multimode optical fiber design with a germania-doped core was modeled for a center wavelength of 850 nm within a wavelength operating window. The germania-doped multimode optical fiber was modeled with a core portion and an outer cladding portion directly contacting the core portion. The multimode optical fibers were modeled as if the core portion was doped with 18 wt. % of $GeO_2$ (which is equivalent to the core portion having a relative refractive index of 1% relative to pure silica glass), a core radius of 25 μm, a core α of 2.125, and an undoped silica cladding having an outer radius of 62.5 microns.

Figure 7A:
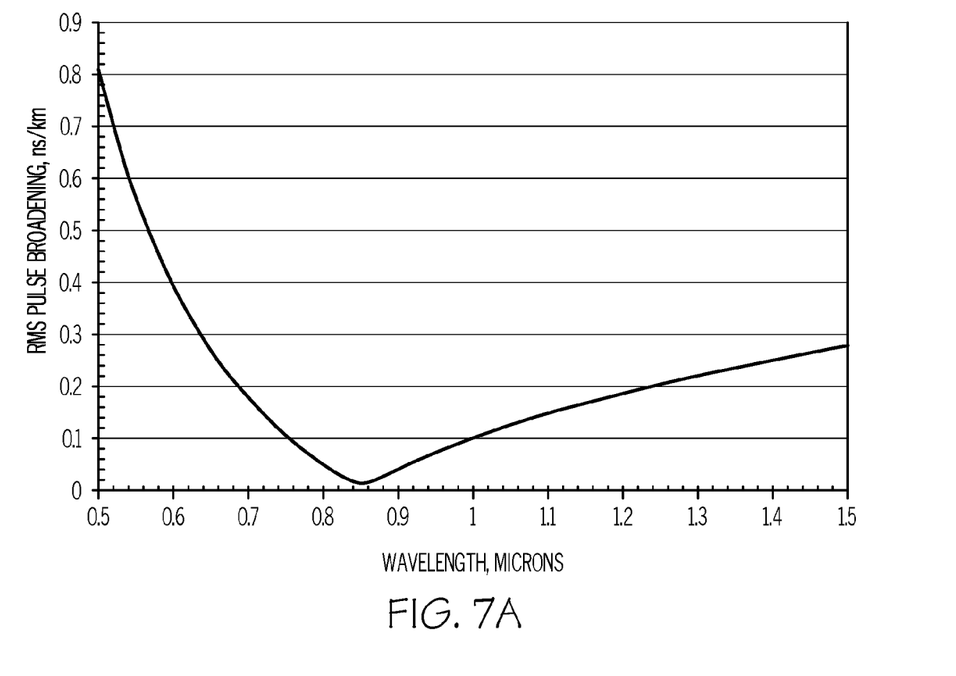
FIG. 7A graphically depicts the RMS delay (y-ordinate) as a function of wavelength (x-ordinate) for a multimode optical fiber having a germania-doped core portion optimized for an operating wavelength of 850 nm.
Figure 7B:
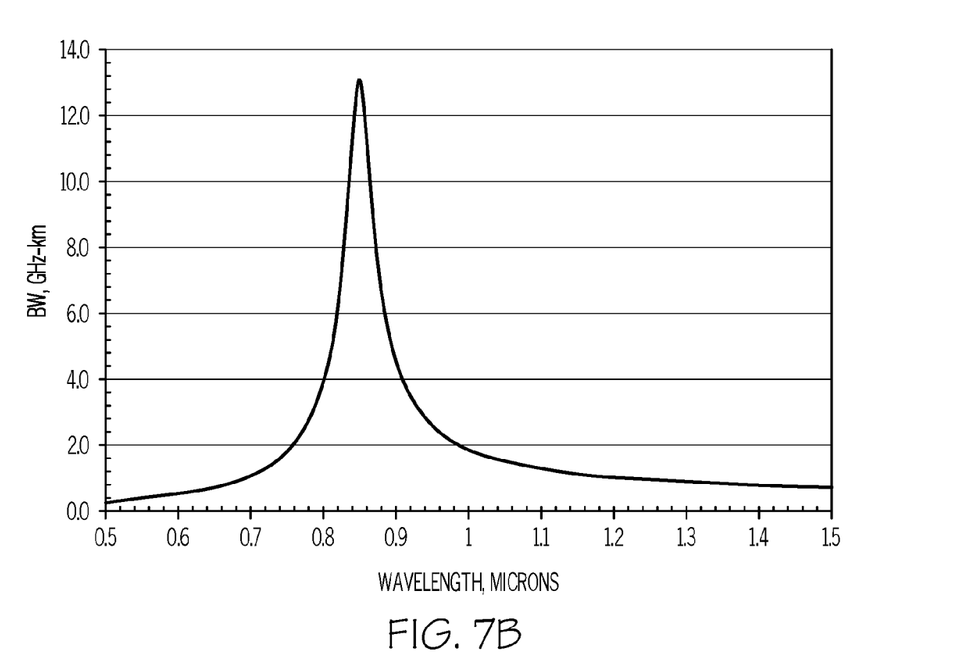
FIG. 7B graphically depicts the bandwidth (y-ordinate) as a function of wavelength (x-ordinate) for the multimode optical fiber of FIG. 7A.

The RMS delay for the germania-doped multimode optical fibers was then calculated as a function of wavelength, as shown in FIG. 7A. As shown in FIG. 7A, the pulse width is a minimum at 850 nm. However, at wavelengths adjacent to 850 nm, the pulse width increases rapidly which, in turn, decreases the bandwidth rapidly at wavelengths outside the peak bandwidth centered at 850 nm, as graphically depicted in FIG. 7B. Similar narrow bandwidth window behavior exists for $GeO_2$ doped silica core fibers centered to have peak bandwidth at other operating wavelengths such as 980, 1060, 1310, and 1550 nm.

Based on the foregoing, it should now be understood that the multimode optical fibers described herein have relatively high bandwidths over a relatively broad range of operating wavelengths. It should also be understood that the multimode optical fibers have relatively low bend losses. The multimode optical fibers are particularly suitable for applications requiring higher bandwidths over a broad range of operating wavelengths such as applications utilizing wavelength division multiplexing. The multimode optical fibers are also particularly suitable for fiber home network applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
a core portion having an alpha profile and formed from $SiO_2$ intentionally doped with a single dopant, wherein the single dopant is phosphorous or a compound of phosphorous;
a glass cladding portion surrounding and in direct contact with the core portion, the glass cladding portion formed from $SiO_2$ and comprising an outer cladding portion and a low-index moat disposed between the core portion and the outer cladding portion, wherein the core portion has a maximum relative refractive index $\Delta_{1max}\%$ relative to the outer cladding portion, the low-index moat has a minimum relative refractive index $\Delta_{3min}\%$ relative to the outer cladding portion, and $\Delta_{1max}\%$ is greater than $\Delta_{3min}\%$, wherein:
the optical fiber is multimoded;
the optical fiber has a bandwidth greater than or equal to 2000 MHz-km for each wavelength within a wavelength operating window centered on a wavelength within an operating wavelength range from about 850 nm to about 1310 nm, the wavelength operating window having a width greater than 100 nm; and
the optical fiber has a restricted launch bend loss less than or equal to 0.5 dB/(2 turns around a 15 mm diameter mandrel) at 850 nm.

2. The optical fiber of claim 1, wherein the bandwidth is greater than or equal to about 4700 MHz-km for each wavelength within the wavelength operating window.

3. The optical fiber of claim 1, wherein the width of the wavelength operating window is greater than or equal to about 200 nm.

4. The optical fiber of claim 1, wherein the wavelength operating window is centered on one of 850 nm, 980 nm, 1060 nm, and 1310 nm.

5. The optical fiber of claim 1, wherein $\Delta_{1max}\%$ is greater than or equal to 0.5% and less than or equal to 2.0%.

6. The optical fiber of claim 1, wherein the single dopant is $P_2O_5$ present in the core portion in a concentration from about 19 wt. % to about 33 wt. %.

7. The optical fiber of claim 1, wherein the low-index moat is spaced apart from the core portion by an inner cladding portion, the inner cladding portion having a relative refractive index $\Delta_2\%$ relative to the outer cladding portion.

8. The optical fiber of claim 7, wherein the inner cladding portion has a radial thickness greater than or equal to about 0.5 μm and less than or equal to about 4 μm.

9. The optical fiber of claim 7, wherein the inner cladding portion has a relative refractive index $\Delta_2\%$, the outer cladding portion has relative refractive index $\Delta_4\%$, and $\Delta_2\% \leq \Delta_4\%$.

10. The optical fiber of claim 7, wherein the inner cladding portion is down-doped with respect to the outer cladding portion.

11. The optical fiber of claim 7, wherein the outer cladding portion is up-doped with respect to the inner cladding portion.

12. The optical fiber of claim 1, wherein the low-index moat has a radial thickness greater than or equal to about 2 μm and less than or equal to about 20 μm.

13. The optical fiber of claim 1, wherein the low-index moat has a moat volume greater than or equal to 80%-μm$^2$.

14. The optical fiber of claim 1, wherein $\Delta_{3min}\%$ is less than or equal to −0.1% and greater than or equal to −1.0%.

15. An optical fiber comprising:
a core portion formed from $SiO_2$ intentionally doped with a single dopant such that the core portion has an α-profile with an α value greater than or equal to 1.95 and less than or equal to 2.15, wherein the single dopant is $P_2O_5$ in a concentration from about 19 wt. % to about 33 wt. %;
a glass cladding portion surrounding and in direct contact with the core portion, the glass cladding portion formed from $SiO_2$ and comprising an outer cladding portion, a low-index moat disposed between the core portion and the outer cladding portion, and an inner cladding portion disposed between the low-index moat and the core portion, wherein the core portion has a maximum relative refractive index $\Delta_{1max}\%$ relative to the outer cladding portion, the inner cladding portion has a relative refractive index $\Delta_2\%$ relative to the outer cladding portion, the low-index moat has a minimum relative refractive index $\Delta_{3min}\%$ relative to the outer cladding portion, the outer cladding portion has a relative refractive index $\Delta_4\%$, $\Delta_{1max}\% > \Delta_2\% > \Delta_{3min}\%$, and $\Delta_4\% \geq \Delta_2\%$ wherein:
the optical fiber is multimoded at wavelengths up to about 1310 nm;
the optical fiber has a bandwidth greater than or equal to 2000 MHz-km for each wavelength within a wavelength operating window centered on at least one wavelength within an operating wavelength range from about 850 nm to about 1310 nm, the wavelength operating window having a width greater than 100 nm; and
the optical fiber has a restricted launch bend loss less than or equal to 0.5 dB/(2 turns around a 15 mm diameter mandrel) at 850 nm.

16. The optical fiber of claim 15, wherein the α value is greater than or equal to 1.98 and less than or equal to 2.05.

17. The optical fiber of claim 15, wherein the bandwidth is greater than or equal to about 4700 MHz-km for each wavelength within the wavelength operating window.

18. The optical fiber of claim 15, wherein the width of the wavelength operating window is greater than or equal to about 200 nm.

19. The optical fiber of claim 15, wherein the wavelength operating window is centered on one of 850 nm, 980 nm, 1060 nm, and 1310 nm.

* * * * *